United States Patent
Halperin et al.

(10) Patent No.: US 9,444,883 B2
(45) Date of Patent: *Sep. 13, 2016

(54) EXTENDING SERVER-BASED DESKTOP VIRTUAL MACHINE ARCHITECTURE TO CLIENT MACHINES

(71) Applicant: VMware, Inc., Palo Alto, CA (US)

(72) Inventors: Yaron Halperin, Sunnyvale, CA (US); Jad Chamcham, Palo Alto, CA (US); Christian M. Leroy, San Francisco, CA (US); Gerald Cheong, East Palo Alto, CA (US); Matthew Eccleston, San Francisco, CA (US); Ji Feng, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 14/165,380

(22) Filed: Jan. 27, 2014

(65) Prior Publication Data
US 2014/0189816 A1    Jul. 3, 2014

Related U.S. Application Data

(63) Continuation of application No. 12/390,819, filed on Feb. 23, 2009, now Pat. No. 8,640,126.

(60) Provisional application No. 61/031,613, filed on Feb. 26, 2008.

(51) Int. Cl.
*G06F 9/455* (2006.01)
*G06F 9/48* (2006.01)
*H04L 29/06* (2006.01)
*H04L 29/08* (2006.01)

(52) U.S. Cl.
CPC ........... *H04L 67/10* (2013.01); *G06F 9/45537* (2013.01); *G06F 9/4856* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,032,131 B2 | 4/2006 | Lubbers et al. | |
| 7,447,854 B1 | 11/2008 | Cannon | |
| 7,526,561 B2 | 4/2009 | Bloch et al. | |

(Continued)

OTHER PUBLICATIONS

International Search Report and Written Opinion mailed in PCT Application No. PCT/US2009/034731 on Sep. 30, 2009.

(Continued)

*Primary Examiner* — Eric C Wai

(57) ABSTRACT

A server-based desktop-virtual machines architecture may be extended to a client machine. In one embodiment, a user desktop is remotely accessed from a client system. The remote desktop is generated by a first virtual machine running on a server system, which may comprise one or more server computers. During execution of the first virtual machine, writes to a corresponding virtual disk are directed to a delta disk file or redo log. A copy of the virtual disk is created on the client system. When a user decides to "check out" his or her desktop, the first virtual machine is terminated (if it is running) and a copy of the delta disk is created on the client system. Once the delta disk is present on the client system, a second virtual machine can be started on the client system using the virtual disk and delta disk to provide local access to the user's desktop at the client system. This allows the user to then access his or her desktop without being connected to a network.

18 Claims, 7 Drawing Sheets

(56) References Cited

U.S. PATENT DOCUMENTS

| | | |
|---|---|---|
| 7,739,738 B1 | 6/2010 | Sobel et al. |
| 7,793,060 B2 | 9/2010 | Zohar et al. |
| 8,640,126 B2 | 1/2014 | Halperin et al. |
| 2003/0233404 A1 | 12/2003 | Hopkins |
| 2004/0117438 A1 | 6/2004 | Considine et al. |
| 2005/0235043 A1 | 10/2005 | Teodosiu et al. |
| 2006/0101189 A1 | 5/2006 | Chandrasekaran et al. |
| 2007/0094659 A1 | 4/2007 | Singh et al. |
| 2007/0174429 A1 | 7/2007 | Mazzaferri et al. |
| 2007/0260702 A1 | 11/2007 | Richardson et al. |
| 2007/0300220 A1 | 12/2007 | Seliger et al. |
| 2008/0086540 A1 | 4/2008 | Scott et al. |
| 2008/0098006 A1 | 4/2008 | Pedersen et al. |
| 2008/0201414 A1 | 8/2008 | Husain et al. |
| 2008/0235361 A1 | 9/2008 | Crosbie et al. |
| 2008/0301770 A1* | 12/2008 | Kinder ............... H04L 63/0823 726/2 |
| 2008/0307408 A1 | 12/2008 | Saldhana |
| 2009/0055507 A1 | 2/2009 | Oeda |
| 2010/0070870 A1 | 3/2010 | Halperin |
| 2010/0306773 A1 | 12/2010 | Lee et al. |

OTHER PUBLICATIONS

Office Action dated May 21, 2013 from Canadian Patent Application No. 2,713,876, 2 pgs.

* cited by examiner

EXTENDING SERVER-BASED DESKTOP VIRTUAL MACHINE ARCHITECTURE TO CLIENT MACHINES

CROSS-REFERENCE TO RELATED APPLICATIONS

This application is a continuation of U.S. patent application Ser. No. 12/390,819 filed Feb. 23, 2009, now U.S. Pat. No. 8,640,126 issued Jan. 28, 2014, which claims benefit of U.S. Provisional Patent Application 61/031,613, which was filed Feb. 26, 2008 and which is wholly incorporated herein by reference.

BACKGROUND OF THE INVENTION

The benefits of computer virtualization have been recognized as greatly increasing the computational efficiency and flexibility of a computing hardware platform. For example, computer virtualization allows multiple virtual computing machines to run on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine.

Server-based computing allows a networked client system, remotely disposed with respect to a server, to access computing resources on the server. For example, a client can use a remote desktop protocol such as RDP or VNC to access a desktop remotely and transmit user input such as keyboard or mouse input to the remote system. Server-based computing facilitates centralized management of computing resources. However, a drawback is a less than optimum computing experience. For example, graphic intensive applications and local devices, such as USB devices, printers and the like, may not operate as desired. Additionally, the user must stay connected to the network to gain access to the user's desktop stored on the server.

As an alternative to server-based computing, client-side computing allows the user to be located away from an enterprise network and in offline mode, i.e., not connected to a network or the Internet. From an enterprise management standpoint, however, client-side computing leads to undesirable inefficiencies when it comes to such tasks as updating operating systems and applications, enforcing security, licensing compliance, locking information, forcing adherence to various policies, and data backup.

SUMMARY

The challenges described above may be addressed by extending server-based desktop-virtual machine architecture to a client machine. In one embodiment, a user desktop is remotely accessed from a client system. The remote desktop is generated by a first virtual machine running on a server system, which may comprise one or more server computers. During execution of the first virtual machine, writes to a corresponding virtual disk are directed to a delta disk file or redo log. A copy of the virtual disk is created on the client system. When a user decides to "check out" his or her desktop, the first virtual machine is terminated (if it is running) and a copy of the delta disk is created on the client system. Once the delta disk is present on the client system, a second virtual machine can be started on the client system using the virtual disk and delta disk to provide local access to the user's desktop at the client system. This allows the user to then access his or her desktop without being connected to a network.

DETAILED DESCRIPTION

Figure 1:
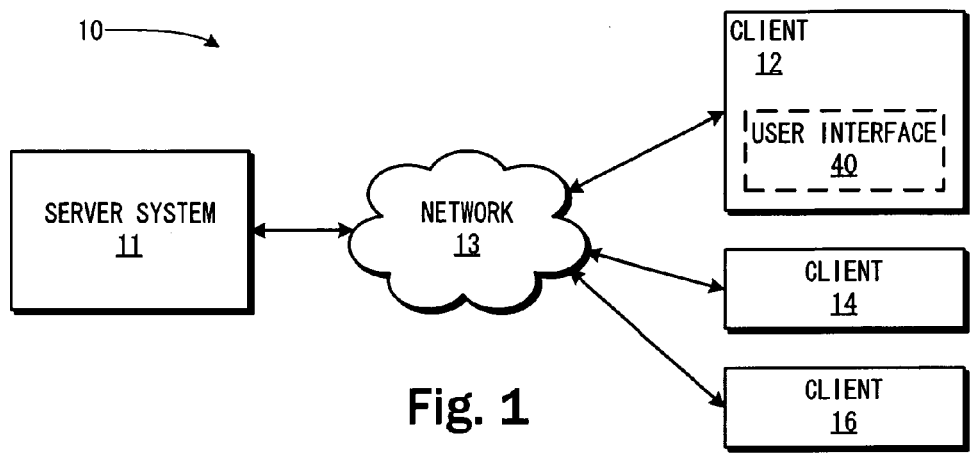
FIG. 1 shows a simple exemplary virtual desktop infrastructure (VDI) system providing access to centrally-managed user desktops.

FIG. 1 shows a simple exemplary virtual desktop infrastructure (VDI) system 10 providing access to centrally-managed user desktops. The term, "desktop" refers to a human interface environment through which users can launch, interact with, and manage the user's applications, settings, and data. Traditionally a desktop is presented by an operating system on a video display, and a user interacts with the desktop using a mouse and keyboard. All applications, documents, etc. may be displayed on the desktop and user input is typically received by applications visible to the user on the display. The term "desktop" is also known to be used to refer to a physical computer system or "physical desktop" that might be placed on or near a user's desk, which is distinct from a "laptop" or "palmtop," but as used herein, the term "desktop" by itself will refer exclusively to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop" therefore is no longer tied to a particular physical computer system.

VDI system 10 includes VDI server system 11 in data communication over network 13 with several VDI client systems 12, 14, and 16. Network 13 may be any configuration, such as a local area network (LAN), or private or publicly accessible wide area network, such as the Internet. It should be recognized that FIG. 1 shows a simplified representation of a typical VDI network server system 11, which may include other components such as firewalls, connection brokers, and load balancers, as well as back-end storage networks, database servers, etc. Each client system 12, 14, 16 may include a user interface 40 (only one shown) through which a user can interact with his or her desktop.

Figure 2:
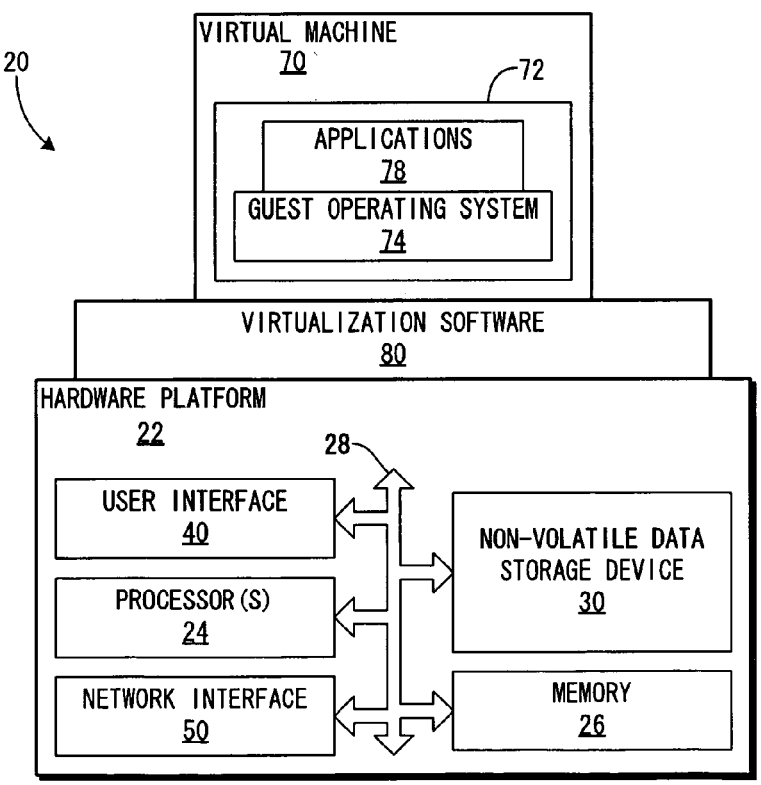
FIG. 2 shows a logical representation of an exemplary virtualized computer system.

FIG. 2 shows a logical representation of an exemplary virtualized computer system 20. As will be explained in more detail below, VDI server system 11, and VDI client systems 12, 14, and 16, may include virtualization software described here with reference to FIG. 2. Virtualized computer system 20 includes a physical hardware platform 22, virtualization software 80 running on hardware platform 22, and one or more virtual machines 70 running on hardware platform 22 by way of virtualization software 80. Virtualization software 80 is therefore logically interposed between the physical hardware of hardware platform 22 and guest system software 72 running "in" virtual machine 70.

Hardware platform 22 may be a general purpose computing system having one or more system buses 28 that place various hardware platform components in data communication with one another. For example, one or more processors 24 are placed in data communication with a memory 26 using system bus(es) 28. Memory 26 may comprise a system of memories including read only memory (ROM), random access memory (RAM), cache memories, and various register memories. Non-volatile data storage 30 may include one or more disk drives or other machine-readable media or mass data storage systems for storing software or data. Memory 26 and/or non-volatile data storage 30 may store virtualization software 80 and guest system software 72 running in virtual machine 70. User interface 40 may be provided including a keyboard controller (not shown), a mouse controller (not shown), a video controller (not shown), and an audio controller (not shown), each of which may be connected to corresponding user devices (not shown). As is typical for server computer systems, for VDI server system 11 (FIG. 1) user interfaces and devices may or may not be included or connected to hardware platform 22. Instead, a user interaction may occur remotely as generally known in the field of data center administration. Network interface 50 enables data communication over a network such as network 13 (FIG. 1). Network interface 50 may facilitate communication using a network protocol, such as TCP/IP.

Virtualization software 80 is well known in the field of computer virtualization. Virtualization software 80 performs system resource management and virtual machine emulation. Virtual machine emulation may be performed by a virtual machine monitor (VMM) component. In typical implementations, each virtual machine 70 (only one shown) has a corresponding VMM instance. Depending on implementation, virtualization software 80 may be unhosted or hosted. Unhosted virtualization software generally relies on a specialized virtualization kernel for managing system resources, whereas hosted virtualization software relies on a commodity operating system—the "host operating system"—such as Windows or Linux to manage system resources. In a hosted virtualization system, the host operating system may be considered as part of virtualization software 80.

Virtual machine 70 conceptually comprises the state of virtual hardware devices (as emulated by virtualization software 80) and contents of guest system software 72. As shown in FIG. 2, guest system software 72 includes a guest operating system 74 and guest applications 78. Guest operating system 74 may be a commodity operating system such as Windows or GNU/Linux. Virtualization software 80 is responsible for managing inputs and outputs to and from virtual machine 70, including directing user interface outputs to local user interface 40 or a remote desktop client.

Figure 3A:
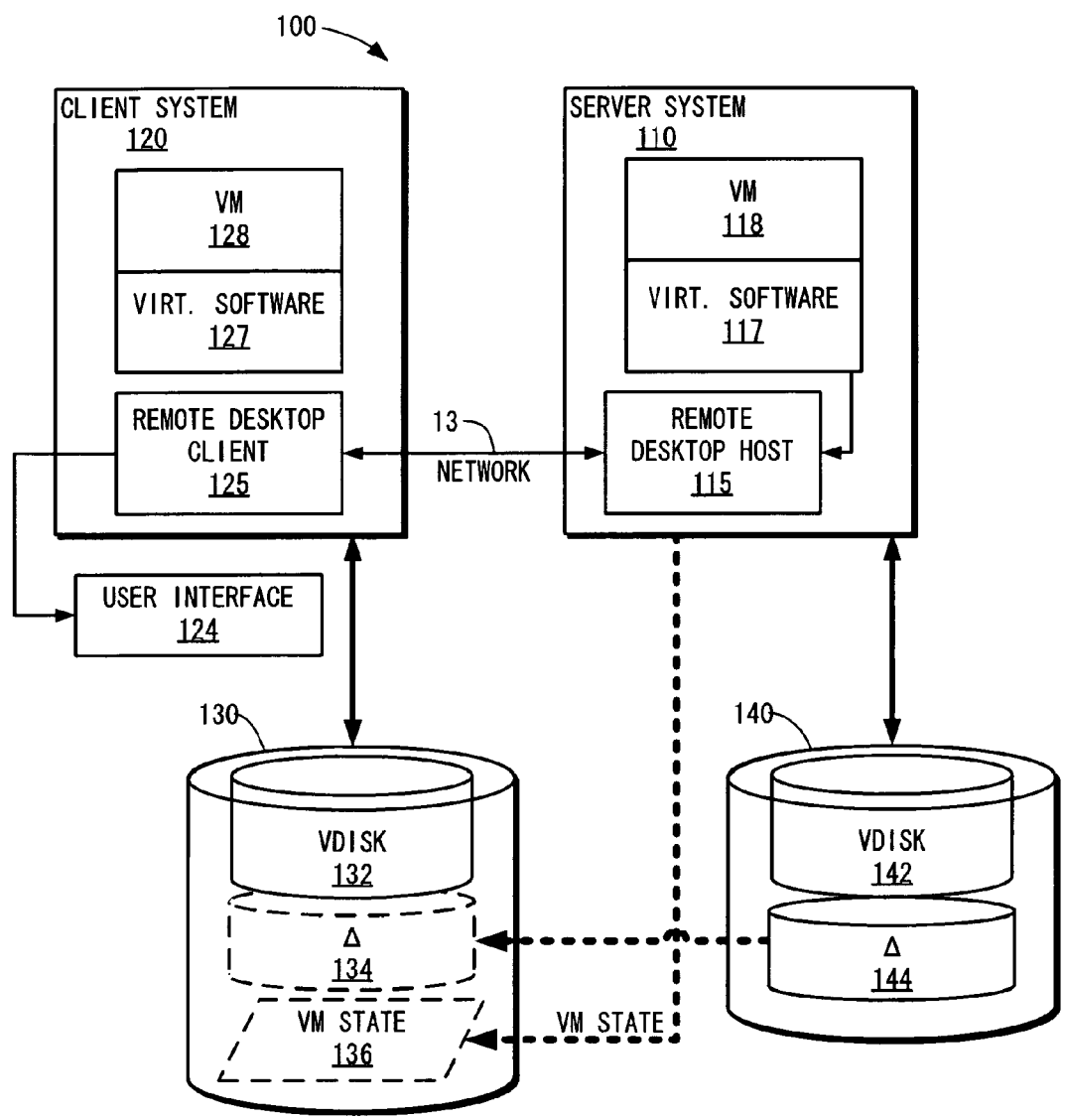
FIGS. 3A, 3B, 3C, and 3D show block diagrams illustrating by way of example operation of the virtual desktop infrastructure system of FIG. 1.
Figure 3B:
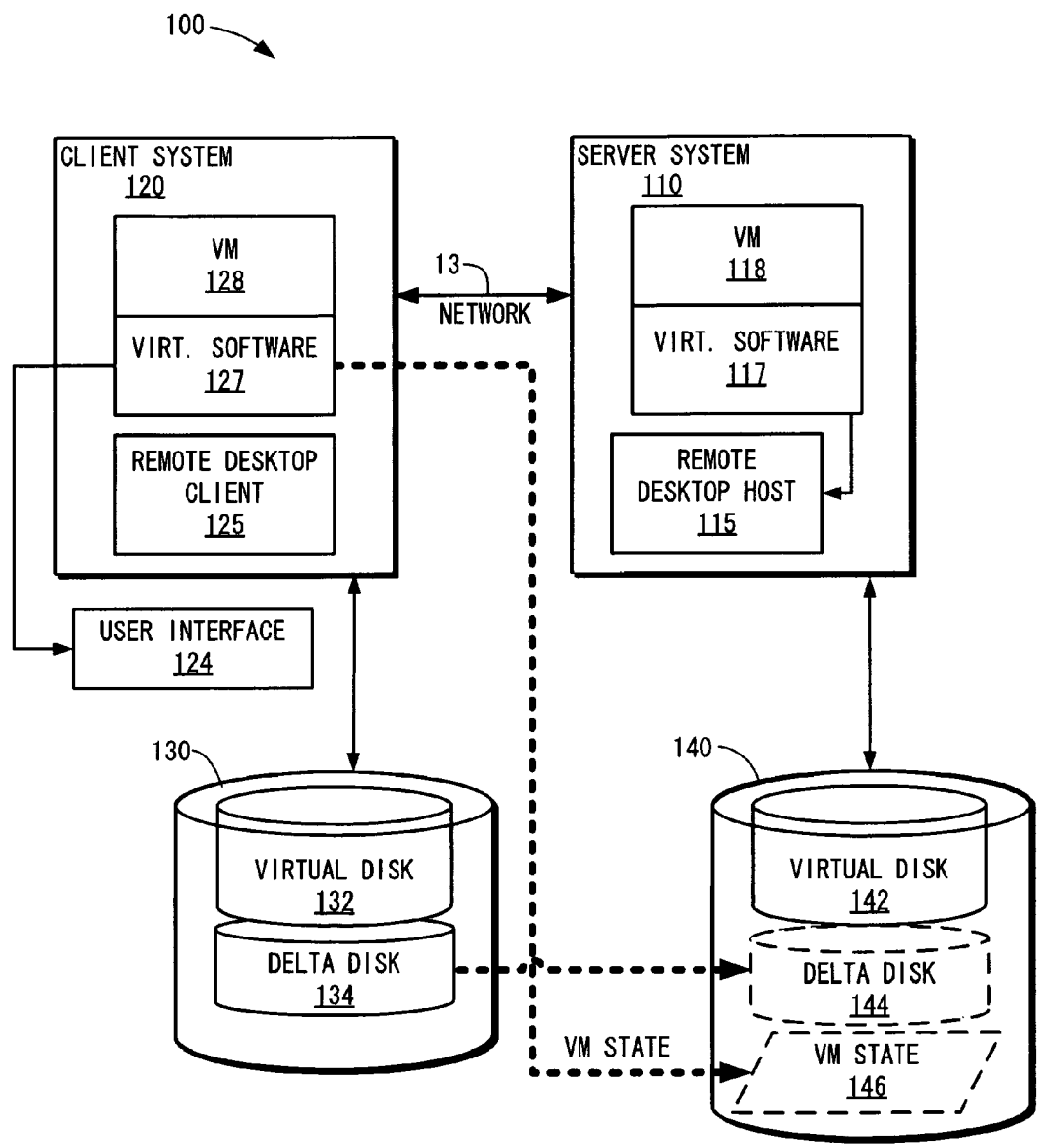

FIGS. 3A and 3B show a simplified block diagram depicting an extensible VDI system 100 having both remote (or centralized) access to users' desktops and local access, allowing a single user to access his or her desktop either remotely or locally. Extensible VDI system 100 includes a server system 110 and client system 120. VM 118 executes on server system 110 and can be accessed by a user via client system 120. VM 118 contains all the user's applications and data as described above with reference to FIG. 2, and is executed using virtualization software 117. In one embodiment, virtualization software 117 comprises non-hosted virtualization software. In addition, although only one VM 118 is shown executing in server 110, any number of VMs may be executing, each associated with one or more corresponding users.

Virtualization software 117 directs user I/O to remote desktop host 115. Remote desktop host 115 transmits user's graphics and sounds to remote desktop client 125. Likewise, remote desktop client 125 sends user's input, e.g., keyboard and mouse inputs, to remote desktop host 115. Remote desktop client 125 presents the user's desktop to the user via user interface 124, which may comprise various user I/O devices.

Client system 120 includes, in addition to remote desktop client 125, a virtual machine 128 along with virtualization software 127. Virtual machine 128 can access virtual disk 132, which is a disk image residing as one or more files on physical disk 130 connected to client system 120. Virtual disk 132 is maintained by virtualization software 127. In one embodiment, virtualization software 127 comprises hosted virtualization software, which runs in conjunction with the client's host operating system as previously described. Virtual disk 132 can be initially copied from virtual disk 142 (or vice versa) such that, in one particular state, virtual disks 132 and 142 are identical or logically equivalent but not identical. By logically equivalent, it is meant that each virtual disk contains the same file system and data files, which are logically related in identical file system structures, although the actual disk sectors may not be ordered the same. Two identical disks are also logically equivalent.

Server system 110 includes or is in communication with a physical disk 140 accessible to server system 110. Physical disk 40, which is used by virtualization software 117 to store user virtual disks, are disk image files for corresponding virtual machines. As the user works on VM 118, it may issue writes to virtual disk 142, which resides as one or more files on physical disk 140. However, rather than writing the changes directly to virtual disk 142, virtualization software 117 may be configured to redirect writes to delta disk 144. Delta disk 144 may comprise a redo log or other "differences" file. In essence, delta disk 144 maintains a list of modifications to virtual disk 142 without actually making any changes to virtual disk 142. Delta disks are known in the art of virtualization and are described in more detail in, e.g., U.S. Pat. No. 7,356,679. When virtual machine 118 issues a read, virtualization software 117 accesses delta disk 144 to determine if the data is there, and if not, it accesses virtual disk 142, the parent disk image for delta disk 144. Virtualization software 117 then delivers the data to virtual machine 118 as though a simple disk read of a physical device took place.

When a user might decide to "check out" his virtual machine, so that it can be accessed off line, i.e., without accessing server system 110, he or she may indicate this desire to management software (not shown, described in more detail below). At this time, virtual machine 118 is "powered off" and delta disk 144 is copied to the user's physical disk 130 to create delta disk 134 on the user's physical disk 130. Once this download is complete and verified, the writes forming delta disk 144 are merged into virtual disk 142 and the delta disk 134 is similarly merged into virtual disk 132 so that virtual disk 132 and virtual disk 142 are maintained in a logically equivalent state but now are updated to reflect the most current state left by the user.

In one embodiment, rather than powering off virtual machine 118, the user may simply suspend, in which case the VM state 136 is also downloaded from virtualization software 117, which maintains the state of virtual machine 118.

FIG. 3B shows extensible VDI system 100 wherein the user is accessing his or her desktop offline by locally running virtual machine 128. In this case, virtualization software 127 runs virtual machine 128 on client system 120 while remote desktop client 125 is not used. Therefore, the user may be disconnected from any network and work offline. Virtualization software 127 does not directly modify virtual disk 132. Rather, it creates a delta disk 134 which contains all the changes the user issued to virtual disk 132 as described previously with respect to delta disk 144 in FIG. 3A.

At some point, the user may desire or be required to "check in" his or her desktop to server system 110. At this time, virtual machine 128 is "powered down" and virtualization software 127 connects to server 110 and copies delta disk 134 to server's data storage 140 to create delta disk 144. In one embodiment, the virtual machine may be suspended rather than powered down, and VM state 146 is uploaded to server system 10. After copying delta disk 134 or the delta disk 134 plus state 146, the delta disks 134, 144 are merged into virtual disks 132, 142, respectively. By "merged" it is meant that the disk writes contained in each of the delta disks are written to the virtual disk files 132, 142, respectively. After this check-in procedure, each of the virtual disks 132, 142 are identical or at least logically equivalent so that the user may begin computing using virtual machine 118 where he or she left off with virtual machine 128.

As will now be described in greater detail, various enhancements and optimizations can be made to the basic operation of the check-in, check-out functionality described above.

Figure 3C:
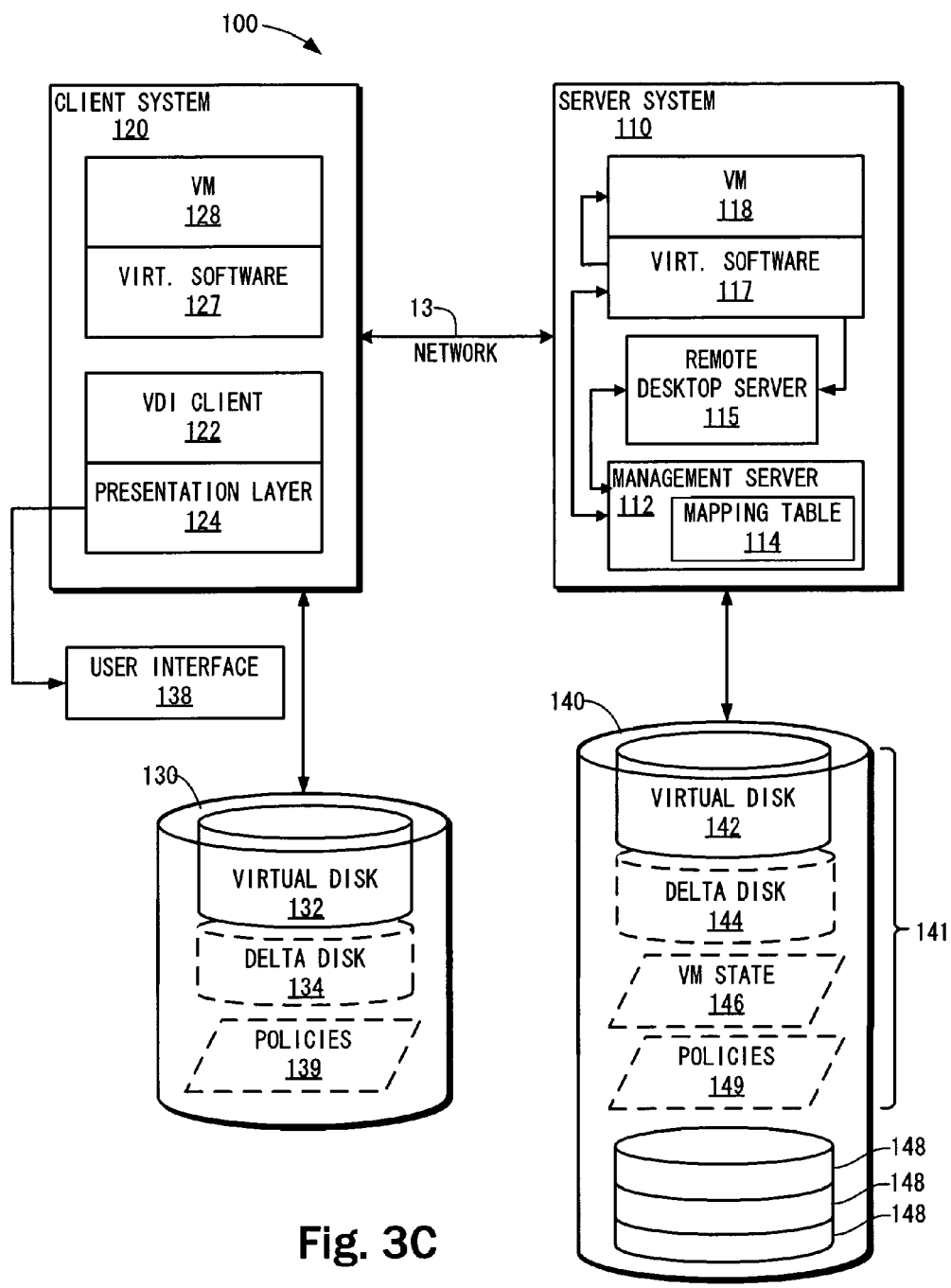

FIG. 3C shows a more detailed view of extensible VDI system 100. A user's desktop is defined by the one or more files 141 residing on physical disk 140 connected to server system 110. Files 141 include files for policies 149, virtual disk, 142, delta disk 144, and VM state 146. Policies may be stored using a database and/or by a configuration file associated or embedded as meta data in virtual disk 142. Additional desktop files 148 may be provided to define additional desktops accessible by a corresponding user or groups of users.

As shown in FIG. 3C, client system 120 includes a VDI client 122 which communicates with management server 112 on server system 110. Management server 112 authenticates the user of client 120, processes requests for access to user desktops, and enforces policies 149. Policies 149 may define to whom and under what circumstances a particular desktop may be made available. For instance, policies 149 may be particular to the user making the request, although global policies, policies based on user's location, or group, or services requested, may also be in place.

In one embodiment, management server 112 is a server application installed on a separate physical computer system that communicates over network 13 to client system 120 and other components of server system 110, which, as explained above, may comprise multiple server machines. In the present example, when a user interacts with VDI client 125 on client system 120, a request is sent via network 13 to server 110 for a desktop associated with the user. As described above, server system 110 may include a plurality of VMs (only one shown) each corresponding to one or more users. management server 112 receives the user's request, authenticates the user and/or the request, starts or resumes VM 118 as necessary, and connects VDI client 125 with remote desktop server 115.

VDI client 122 includes a presentation layer 124 that provides a graphical user interface allowing the user to interact with VDI client 122 and therefore, server system 110. In one embodiment, VDI client 122 executes within or in conjunction with an Internet browser.

At some point, the user may wish to "check-in" or "check-out" his or her desktop as described above with reference to FIGS. 3A and 3B. In this case, the virtual disk or delta disk is copied either from client system 120 to server system 110 or vice versa (depending on whether the user is "checking-in" or "checking-out" the desktop). If the user is checking out the desktop to a computer that does not have a local copy of the virtual disk, then delta disk 144 may be merged with virtual disk 142 on server system 110 and the entire virtual disk copied to the user's local client system 120. Because the virtual disk can be quite large, this initial check-out may be very time consuming due to the large quantity of data and potentially limited bandwidth. Even delta disks transmitted during subsequent check-in and check-out procedures can become quite large depending on user activity, e.g., a new application may be installed or an existing application or operating system component may be extensively upgraded or patched.

In one embodiment, the required time for checking-in and checking-out user desktops may be reduced by transmitting data between client system 120 and server system 110 in the background, i.e., while a user is interacting with a virtual machine but without interfering with user activity or the operation of the virtual machine. This may be referred to as background synchronization or background data transfer. Background data transfer may occur automatically in response to a user of client system 120 simply being granted access to VM 118. In this manner, an accurate and updated representation of virtual disk 142 may be transferred to and from client system 120 without noticeably detracting from a user's computing experience. When a user begins working remotely from a new client system 110, virtual disk 142 may be transferred in the background until a complete copy of is made available as virtual disk 132 on client system 120. Thereafter, changes to virtual disk 142 are transmitted in the background to client system 120 to begin building delta disk 132. When a user decides to check-out his or her desktop, at least a majority of the changes to virtual disk 142 will already have been transferred to client system 120. Likewise, when a user decides to check-in his or her desktop, at least a majority of the changes to virtual disk 132 will already have been transferred to server system 110.

When a user decides to log off of their session with their desktop, any remaining differences between delta disk 144 and delta disk 134 are resolved by transferring final changes. After completion of communication between client system 120 and server system 110, changes represented in delta disk 144 may be written to virtual disk 142. In one embodiment, this would occur after operation of VM 118 is terminated to ensure a steady state of VM 118 while updating virtual disk 142. Termination of operation of VM 118 may include powering down VM 118, or suspending operation of VM 118. Powering down a VM typically involves executing a power-down procedure of the guest operating system running in the VM. In this procedure, processes are ended and any transient or cached data currently residing in memory is written to disk. Little or no state information is present when a VM is powered down, whereas a suspend operation involves stopping execution and preserving the state of the virtual machine by writing to VM state file 146.

Once delta disk 144 is merged with virtual disk 142, delta disk 144 may be erased, marked for deletion, or otherwise identified as no longer being valid. Making virtual disk 132 consistent with virtual disk 142 and any changes made to either virtual disk is referred to as synchronization. The user's virtual machines may be synchronized in this way after local execution of VM 128 has terminated in the same manner as described above with reference to terminating operation of virtual machine 118 described above.

Management server 112 may establish or enforce a policy that precludes the operation of virtual machine 118 until it could be ascertained that there are no virtual machines 128 corresponding to virtual machine 118 that are not synchronized with virtual machine 118. That is, if the user has interacted off-line with his or her desktop, thereby causing the creation of a delta disk 134, then the management server 112 may prevent use of VM 118 until the changes represented by delta disk 134 are transmitted to server system 110 and merged with virtual disk 142.

Maintaining synchronization of the information corresponding to the user's desktop may include implementing policy management over the user's desktop. Examples of policies 149 include information as to whether or under what conditions may a copy of the user's desktop may be transferred to a client system 120, how long the desktop may be checked-out before being checked back in to server system 110, restrictions on the use of virtual machine 128/118, and the like. Virtualization software 127 and/or VDI client 122 may be configured to enforce established policies, e.g., using encryption to prevent unauthorized access to data stored on virtual disk 132, and associated delta disks.

In one embodiment, when a user starts VDI client 122, he or she may be presented with a log-in screen requesting authentication information. VDI client then communicates the authentication information to server system 110, e.g., to remote desktop server 112. Remote desktop server 115 validates the user's authentication and sends a request to management server 112 for an existing desktop corresponding to the user's authentication information. Management server 112 receives the request from remote desktop server 115 and compares the provided user identifier with mapping table 114, which associates the user identifier with one or more virtual machines on server system 110. Upon identifying the virtual machine(s) associated with the user identifier, Management server 112 provides connection information or otherwise facilitates connection between VDI client 110 and remote desktop server 115 for remote user access to the corresponding desktop.

In another embodiment, a user request transmitted to server system 110 may include local desktop status information. Local status information may also be provided separately from the request in response to a query from remote desktop server 115. Local status information may include information that help identify differences between the state of the user's local client system 120 and server system 110. For example, local status information may include whether or not the user has accessed his or her desktop offline, causing the creation of delta disk 134. If a delta disk 134 is present, then management server 112 would commence transmission of the difference in the background prior to permitting access to virtual machine 118. If the transmission time is projected to be lengthy, then the user may be immediately connected to local VM 128 during background synchronization. If there is no delta disk 134, but a delta disk 144 is present, then connection to VM 118 may be permitted with concomitant automatic background synchronization.

In one embodiment, background data transfer may occur in response to a periodic query that automatically occurs while client system 120 is accessing server system 110. In another embodiment, background data transfer may occur only upon a request by the user of client system 120. For example, the user may request that the local client system 110 be synchronized with server system 110 in contemplation of going off line. For users that rarely go offline, use of this feature may significantly reduce the load on network resources. Policies 149 may require, allow (i.e., let the user decide), or prevent continuous, periodic, or user-initiated synchronization.

Figure 3D:
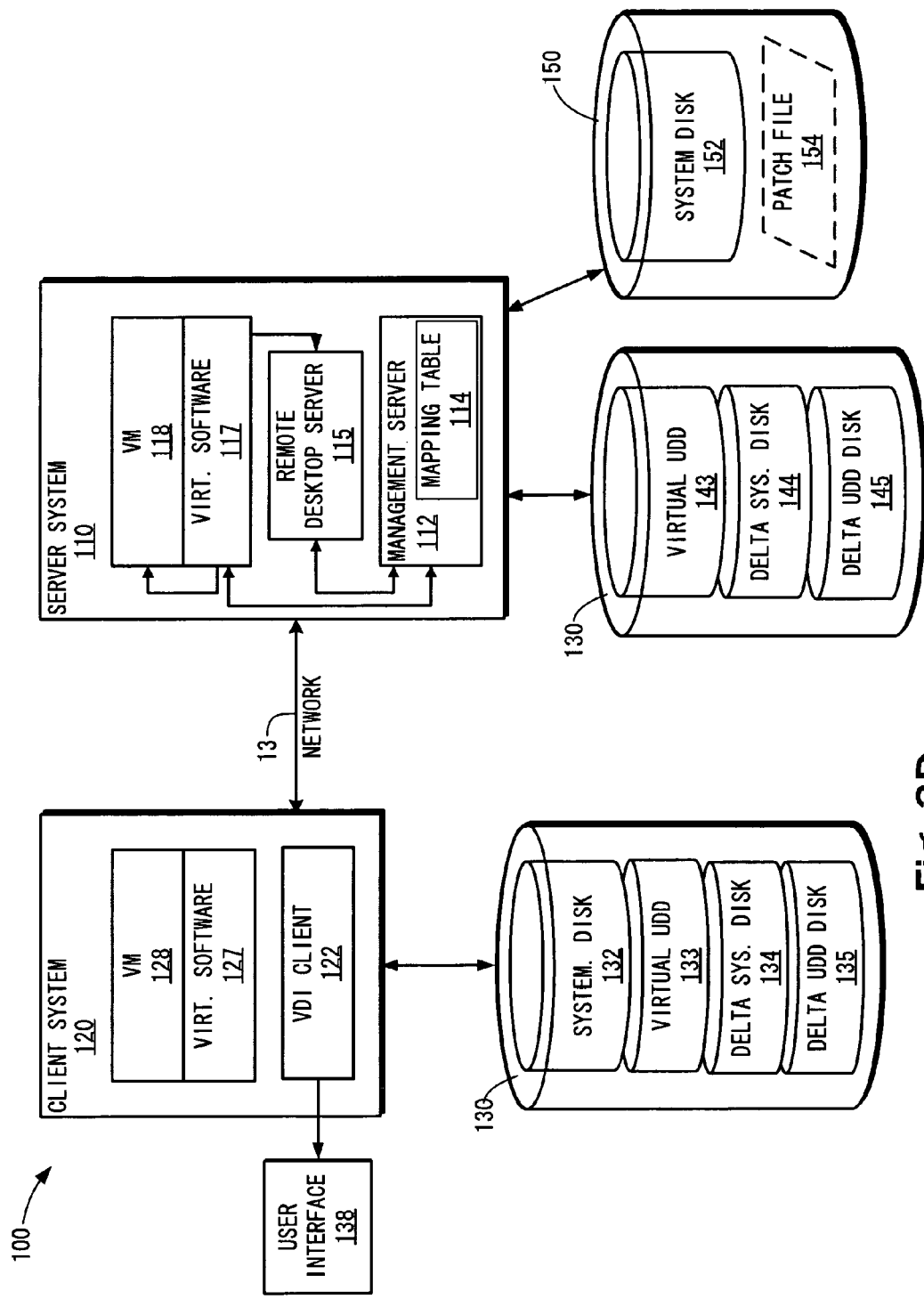

In an embodiment represented by way of example in FIG. 3D, user data and system data are maintained in separate virtual drives. In this embodiment, the amount of data that to be transferred may be further reduced by writing only user data to delta user data disk 135 or 145 (depending on whether the user is accessing his or her desktop locally or remotely). For example, information for a user's desktop on server system 110 may be classified as system information stored in system disk 152, which may exist as a disk image file on physical disk 150, and user data may be stored in virtual user data disk (UDD) 143. Likewise changes to these two disks may be stored in two separate delta disks: delta system disk 144 and delta UDD disk 145.

In one embodiment, system information includes application information 78 and guest system software 72 (FIG. 2) whereas user data includes documents, settings, user-specific properties, etc. Most operating systems such as Windows, OSX®, and Gnu-Linux include a facility for maintaining system and user data on separate disks. By using virtualization to produce separate delta images for both system data and user data, management server 112 may be configured to limit transfer of data to only user information stored on virtual UDD 143. In this case, any changes made to the system (and therefore written to delta system disk 144) will be discarded and system disk 152 will therefore revert back to a known good state with each check-in or check-out of the user's desktop, since that information is not transferred. Furthermore, the amount of information that is transferred between client system 112 and server system 110 may be reduced to only user data.

In one embodiment, changes to system disk 152, maintained on a separate delta system disk 144 during operation of the virtual machine, may be subject to whatever policies are in place for that user. I.e., they may be discarded or merged back into the virtual disk containing system data, the operating system, and applications. If delta system disk 144 is discarded, then system disk 152 may be considered a "persistent system disk" in that it persists in a known good state despite whatever changes the user makes to the system during any particular user session.

Modifications to system disk may be packaged in patch file 154, e.g., when the operating system or applications are updated or a new release is issued by the manufacturer. These changes may be applied to system disk 152 by creating patch file 154 which defines differences between a current system disk and an updated system disk. The patch file may be applied to system disk 152 to created a patched system disk, and also transmitted to client system 120, for efficient patching of system disk 132 on the client system.

In another embodiment that can coexist with other embodiments described herein, file system information is analyzed to identify sectors that are associated with deleted files. These sectors are then omitted when transferring the delta disk image to further reduce the amount of data being transferred. The analysis and omission can occur at the time of the transfer of the delta disk, or can be performed as a separate step wherein the delta disk is pre-processed prior to transmission. In this case, copies of the virtual disk may not be identical, but are nevertheless logically equivalent.

Figure 4:
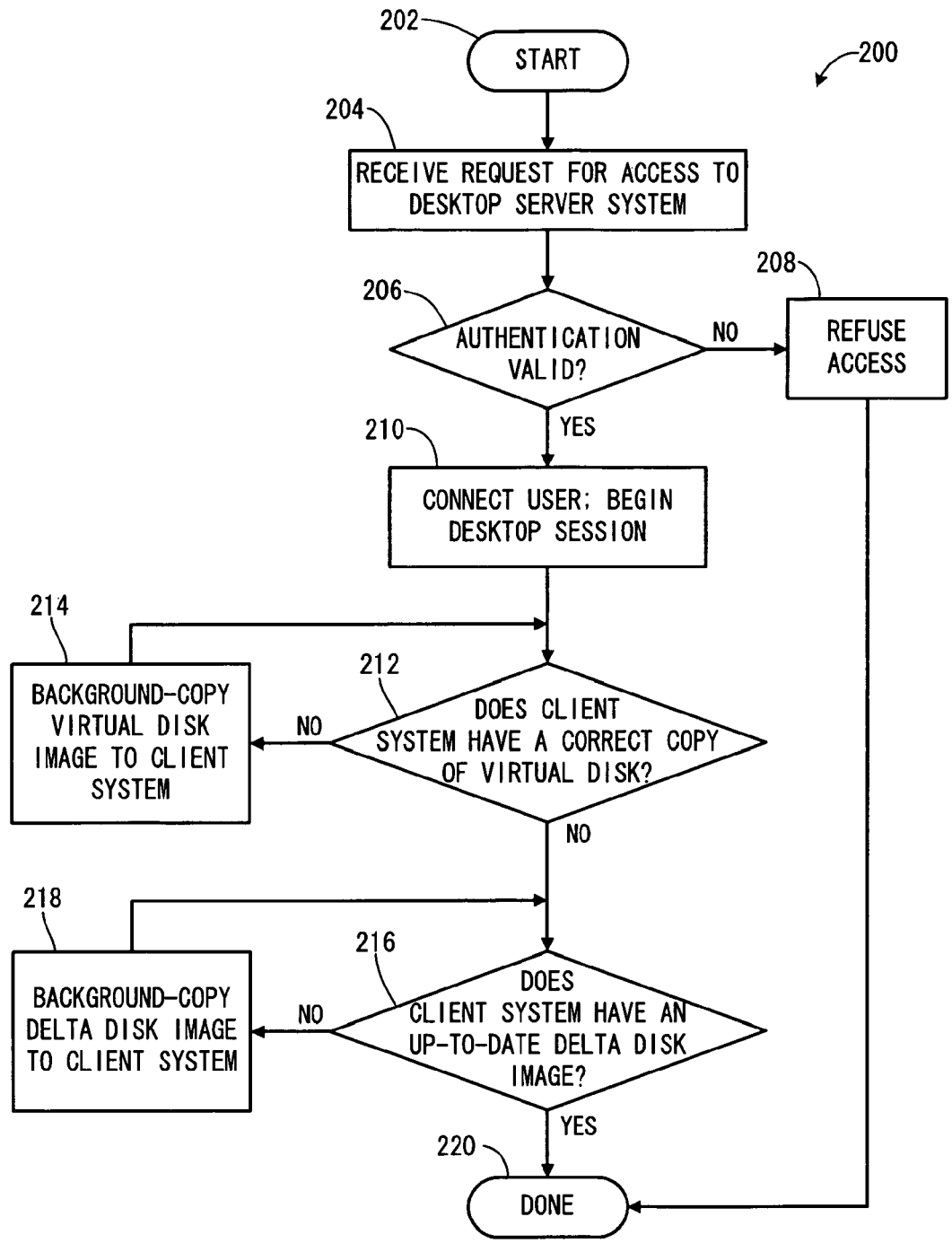
FIG. 4 shows flowchart showing an exemplary procedure for connecting a user to a remote desktop with automatic background synchronization.

FIG. 4 shows flowchart 200 showing an exemplary procedure for connecting a user to a remote desktop with automatic background synchronization. The procedure begins as indicated by start block 202 and flows to operation 204 wherein a request is received by server system 120 (FIGS. 3A-3D) to access a desktop corresponding to authentication information of the user of client system 120. In response to receiving this request, the procedure flows to operation 206, wherein server system 110 validates user authentication. If the authentication is invalid, then the procedure flows to operation 208 wherein access is refused and the procedure ends. If authentication is valid, then the procedure flows to operation 210, wherein the user is connected to a desktop corresponding to the user identifier. After connecting the user to his or her desktop on the virtual machine executing on the server system, the procedure flows to operation 212, wherein server system 110 determines whether client system 120 has a correct copy of the virtual disk corresponding to the user's desktop. If not, then the procedure flows to operation 214, wherein virtual disk 142 is transmitted to client system 120 in the background, i.e., while user is accessing and interacting with the virtual machine 118 on the server system. This operation continues until client system 120 has been provided with a complete correct copy of the virtual disk for the corresponding desktop.

If, in operation 212, it is determined that the client system has a correct copy of the virtual disk, then the procedure flows to operation 216. As mentioned previously, during user interaction with the virtual machine on the server system, changes to the virtual disk are written to a delta disk. In operation 216, server system 110 determines whether the client system has an up-to-date copy of the delta disk image. If not, then the procedure flows to operation 218 wherein the delta disk on the server system is copied to the user's client system. This procedure occurs as long as the user is interacting with the virtual machine and therefore generating changes to the virtual disk. At some point, the user may log off, power down or suspend the virtual machine executing on the server system, at which point any remaining changes are copied to the client system. Then the procedure ends as indicated by done block 220.

In one embodiment, background synchronization may be initiated at any time during a communication session between client system 120 and server system 110. The background synchronization may occur automatically (e.g., according to a policy set by an administrator) or at user request.

For example, the request or policy may specify that the user's client system be updated periodically. In this case, server system 110 determines whether a specified amount of time has elapsed since the most recent update. Rather than a strict time measurement, other means of identifying an update time may of course be implemented, e.g., a clock can measure amount of time passed, or the system may wait until the user is idle, i.e., has not interacted with the system for some time. If the client system is not up to date, and depending on the current state of virtual disks in server system 110, i.e., whether a delta disk 144 (FIGS. 3A-3D) is present, system 110, in coordination with client system 120, begins transmitting the virtual disk 142 and/or delta disk 144 containing modifications to virtual disk 142.

In one embodiment, new changes to delta disk 144 are appended to delta disk 144 as VM 118 is executing, and transmitted periodically to user system 120. Server system 110 keeps track of how much of the delta disk has been transferred to client system 120, so that only the appended portion is transmitted at each update interval.

In another embodiment, the current delta disk is closed and a new delta disk is created at each update interval. The current delta disk, which contains modifications to information contained in previous delta disks is transmitted while new changes are written to the new delta disk. In this manner, a series of chained snapshots are be created and transmitted to client system 120, which can then reassemble or merge them into a single delta disk or directly into the virtual disk. In one embodiment, each delta disk is scanned and/or cleaned of malware such as viruses prior to transmission to client system 110. The scanning may be performed in the background in an unobtrusive manner.

Figure 5:
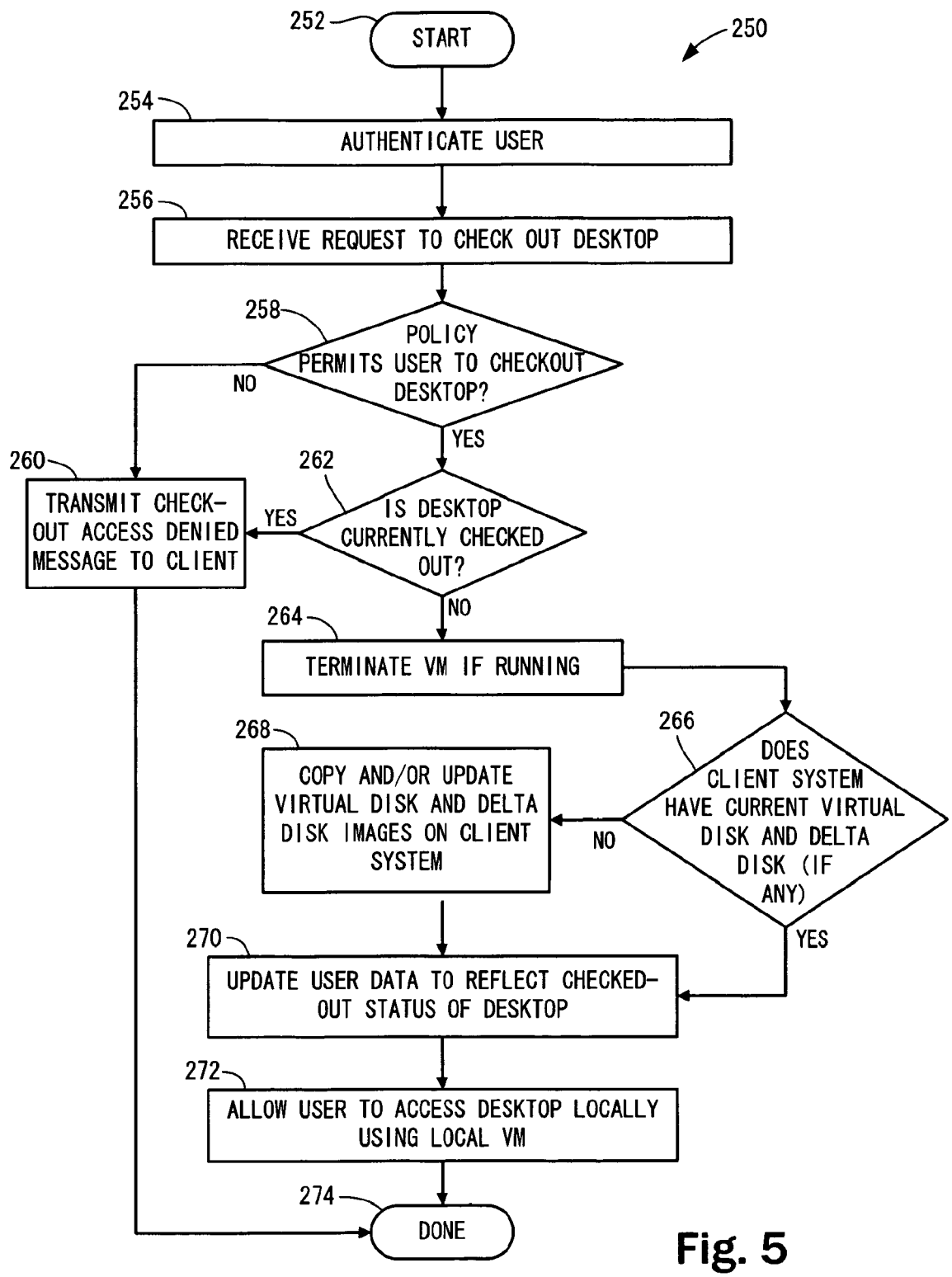
FIG. 5 shows flow chart representing by way of example a method for implementing a desktop check-out procedure.

FIG. 5 shows flow chart 250 representing by way of example a method for implementing a desktop check-out procedure. The procedure begins at start block 252 and proceeds to operation 254 wherein the server system authenticates a user that requests access. Depending on the implementation, the user may or may not be immediately connected to his or her remote desktop at this time. The procedure then flows to operation 256 wherein the server system receives a request by the user to check out the desktop. The procedure then flows to operation 258 wherein the server system determines whether the policy and user permissions allow check-out of the user's desktop to the user. If not, the procedure flows to operation 260 wherein a message is transmitted to the client system indicating that he or she does not have privileges to checkout his or her desktop a the present time. The procedure then ends as indicated by done block 274. If, in operation 258, it is determined that the user indeed has permission to checkout the desktop, then the procedure flows to operation 262 to determine whether the user's desktop is already checked out e.g., to a different client system, and as not since been checked back in. User desktop status may be maintained in, e.g., a user database or in a status field, meta data field, or sub-section in or of the file containing the virtual disk image. If the user's desktop is currently checked-out, then the procedure flows to operation 260 and server system 120 transmits a check-out access denied message to client system 12. This ensures that only one copy of the user's desktop may be checked-out at a time. In one embodiment, the user is prevented from remotely accessing his or her desktop when the desktop is in a "checked-out" state, which would result in "branching" of the virtual machines and loss of synchronization. If it is determined in operation 262 that the desktop is not already currently checked out, then the procedure flows to operation 264 wherein if running, the user's virtual machine is terminated. Terminating the virtual machine may include powering it down or suspending the virtual machine and saving the state to disk.

The procedure then flows to operation 266 wherein the client system is queried to determine whether it has a current copy of the system disk and any delta disks that may be present on the server system. If not, then the procedure flows to operation 268 wherein the virtual disk and delta images are copied or updated as needed, and then the procedure flows to operation 270. If, in operation 266, it is determined that the client system already had current copies of the virtual disk and any delta disks, then the procedure flows directly to operation 270.

In operation 270, the user or meta data is updated to reflect the now "checked out" status of the user's desktop. The procedure the flows to operation 272 wherein the user is permitted to access his or her desktop by running the local virtual machine on the local client system. The procedure then ends as indicated by done block 274.

In one embodiment, a user may be permitted to access his or her desktop remotely even though it is checked out to a client system. Although the desktop may be in a checked-out state this does not preclude a user of client system 120 from utilizing resources of server system 110 to remotely access his or her desktop. For example, the client system 120 may experience a system failure such as a hard drive malfunction or be infected by a virus/malware. In this case, the user may choose to discard the local virtual machine access the corresponding virtual machine on server system 110 despite not having checked-in the desktop to the server system. Alternatively, the user may be permitted to access the desktop on the server system with the understanding that any changes made to the server system will be lost. For example, if a user is unable to access their client system, i.e., they are away from their computer but need access to their desktop, e.g., to read a file or access email or a corporate intranet site, they would still be able to access their desktop remotely, albeit an out-of-date version, and without any persistence of newly-saved data.

In another enhancement, the system may automatically, or upon user request, perform a virus/malware scan on the information contained on data storage 140, i.e., delta disks 144 or 145 (FIGS. 3A-3D). The results of the virus/malware scan may be logged on the system and/or provided to client system 120 or stored in a results file (not shown). Similarly, a user of client system 120 may use server system 110 to perform a virus/malware scan of local delta disk 134 by producing a copy of the local delta disk on data storage 140. After the virus/malware scan has completed, the copy of the local delta disk may be deleted, or merged into virtual disk 142.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage system that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage systems. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method comprising:
receiving, by a server system, a request from a user of a client system for accessing a user desktop, wherein the user desktop is provided by a server-side virtual machine (VM) running on the server system, and wherein the server system is configured to direct disk read requests from the server-side VM to a server-side virtual disk file and direct disk write requests from the server-side VM to a server-side delta disk file;
connecting, by the server system, the user to the user desktop;
determining, by the server system, whether the client system has a client-side virtual disk file that is logically equivalent to the server-side virtual disk file;
if the client system does not have a client-side virtual disk file that is logically equivalent to the server-side virtual disk file, copying, by the server system, the server-side virtual disk file to the client system via a first background process while the user is remotely interacting with the user desktop;
determining, by the server system, whether the client system has a client-side delta disk file that is logically equivalent to the server-side delta disk file; and
if the client system does not have a client-side delta disk file that is logically equivalent to the server-side delta disk file, copying, by the server system, the server-side delta disk file to the client system via a second background process while the user is remotely interacting with the user desktop.

2. The method of claim 1 further comprising:
authenticating the user prior to connecting the user to the user desktop.

3. The method of claim 1 further comprising:
receiving, by the server system, a checkout request from the user for checking out the user desktop from the server system to the client system;
accessing, by the server system, a management policy to determine whether the user has appropriate privileges to check out the user desktop; and
if the management policy indicates that the user does not have the appropriate privileges, transmitting, by the server system, a denial message to the user.

4. The method of claim 1 further comprising:
receiving, by the server system, a checkout request from the user for checking out the user desktop from the server system to the client system;
determining, by the server system, if the user desktop is already checked out;
if the user desktop is already checked out, transmitting, by the server system, the denial message to the user; and
if the user desktop is not already checked out:
  terminating, by the server system, execution of the server-side VM;
  updating, by the server system, data associated with the user to reflect a checked-out status of the user desktop; and
  permitting, by the server system, the user to access the user desktop via a client-side VM running on the client system.

5. The method of claim 4 further comprising:
merging, by the server system, the server-side delta disk file into the server-side virtual disk file.

6. The method of claim 1 wherein copying the server-side delta disk file to the client system comprises:
analyzing file system information in the server-side delta disk file to identify sectors associated with deleted VM guest files; and
omitting the identified sectors when copying the server-side delta disk file to the client system.

7. A non-transitory computer readable medium having stored thereon computer software executable by a processor of a server system, the computer software embodying a method comprising:
receiving a request from a user of a client system for accessing a user desktop, wherein the user desktop is provided by a server-side virtual machine (VM) running on the server system, and wherein the server system is configured to direct disk read requests from the server-side VM to a server-side virtual disk file and direct disk write requests from the server-side VM to a server-side delta disk file;
connecting the user to the user desktop;
determining whether the client system has a client-side virtual disk file that is logically equivalent to the server-side virtual disk file;
if the client system does not have a client-side virtual disk file that is logically equivalent to the server-side virtual disk file, copying the server-side virtual disk file to the client system via a first background process while the user is remotely interacting with the user desktop;
determining whether the client system has a client-side delta disk file that is logically equivalent to the server-side delta disk file; and
if the client system does not have a client-side delta disk file that is logically equivalent to the server-side delta disk file, copying the server-side delta disk file to the client system via a second background process while the user is remotely interacting with the user desktop.

8. The non-transitory computer readable medium of claim 7 wherein the method further comprises:
authenticating the user prior to connecting the user to the user desktop.

9. The non-transitory computer readable medium of claim 7 wherein the method further comprises:
receiving a checkout request from the user for checking out the user desktop from the server system to the client system;
accessing a management policy to determine whether the user has appropriate privileges to check out the user desktop; and
if the management policy indicates that the user does not have the appropriate privileges, transmitting a denial message to the user.

10. The non-transitory computer readable medium of claim 7 wherein the method further comprises:
receiving a checkout request from the user for checking out the user desktop from the server system to the client system;
determining if the user desktop is already checked out;
if the user desktop is already checked out, transmitting the denial message to the user; and
if the user desktop is not already checked out:
  terminating execution of the server-side VM;
  updating data associated with the user to reflect a checked-out status of the user desktop; and
  permitting the user to access the user desktop via a client-side VM running on the client system.

11. The non-transitory computer readable medium of claim 10 wherein the method further comprises:
merging the server-side delta disk file into the server-side virtual disk file.

12. The non-transitory computer readable medium of claim 7 wherein copying the server-side delta disk file to the client system comprises:

analyzing file system information in the server-side delta disk file to identify sectors associated with deleted VM guest files; and omitting the identified sectors when copying the server-side delta disk file to the client system.

13. A server system comprising:

a processor; and a non-transitory computer readable medium having stored thereon instructions that, when executed by the processor, cause the processor to:

receive a request from a user of a client system for accessing a user desktop, wherein the user desktop is provided by a server-side virtual machine (VM) running on the server system, and wherein the server system is configured to direct disk read requests from the server-side VM to a server-side virtual disk file and direct disk write requests from the server-side VM to a server-side delta disk file;

connect the user to the user desktop;

determine whether the client system has a client-side virtual disk file that is logically equivalent to the server-side virtual disk file;

if the client system does not have a client-side virtual disk file that is logically equivalent to the server-side virtual disk file, copy the server-side virtual disk file to the client system via a first background process while the user is remotely interacting with the user desktop determine whether the client system has a client-side delta disk file that is logically equivalent to the server-side delta disk file; and if the client system does not have a client-side delta disk file that is logically equivalent to the server-side delta disk file, copy the server-side delta disk file to the client system via a second background process while the user is remotely interacting with the user desktop.

14. The server system of claim 13 wherein the instructions further cause the processor to:

authenticate the user prior to connecting the user to the user desktop.

15. The server system of claim 13 wherein the instructions further cause the processor to:

receive a checkout request from the user for checking out the user desktop from the server system to the client system;

access a management policy to determine whether the user has appropriate privileges to check out the user desktop; and if the management policy indicates that the user does not have the appropriate privileges, transmit a denial message to the user.

16. The server system of claim 13 wherein the instructions further cause the processor to:

receive a checkout request from the user for checking out the user desktop from the server system to the client system;

determine if the user desktop is already checked out;

if the user desktop is already checked out, transmit the denial message to the user; and if the user desktop is not already checked out:

terminate execution of the server-side VM;

update data associated with the user to reflect a checked-out status of the user desktop; and permit the user to access the user desktop via a client-side VM running on the client system.

17. The server system of claim 16 wherein the instructions further cause the processor to:

merge the server-side delta disk file into the server-side virtual disk file.

18. The server system of claim 13 wherein the instructions that cause the processor to copy the server-side delta disk file to the client system comprise instructions that cause the processor to:

analyze file system information in the server-side delta disk file to identify sectors associated with deleted VM guest files; and omit the identified sectors when copying the server-side delta disk file to the client system.

\* \* \* \* \*